US007583678B1

(12) United States Patent
Levy et al.

(10) Patent No.: US 7,583,678 B1
(45) Date of Patent: Sep. 1, 2009

(54) METHODS AND APPARATUS FOR SCHEDULING ENTITIES USING A PRIMARY SCHEDULING MECHANISM SUCH AS CALENDAR SCHEDULING FILLED IN WITH ENTITIES FROM A SECONDARY SCHEDULING MECHANISM

(75) Inventors: Danny Levy, Petah-Tiqwa (IL); Dalit Sagi, Ramat Hagolan (IL)

(73) Assignee: Cisco Technology, Inc, San Jose, CA (US)

( * ) Notice: Subject to any disclaimer, the term of this patent is extended or adjusted under 35 U.S.C. 154(b) by 1022 days.

(21) Appl. No.: 10/260,059

(22) Filed: Sep. 27, 2002

(51) Int. Cl.
   *H04L 12/56* (2006.01)
(52) U.S. Cl. .................. 370/395.4; 370/230; 370/412
(58) Field of Classification Search .............. None
   See application file for complete search history.

(56) References Cited

U.S. PATENT DOCUMENTS

| 6,914,881 | B1 * | 7/2005 | Mansfield et al. | ........... 370/230 |
| 2003/0231590 | A1 * | 12/2003 | Zhao et al. | .............. 370/230.1 |
| 2004/0001491 | A1 * | 1/2004 | Ruutu et al. | ............. 370/395.4 |
| 2004/0017825 | A1 * | 1/2004 | Stanwood et al. | ........... 370/468 |

OTHER PUBLICATIONS

C. Partridge, "A Proposed Flow Specification," RFC 1363, Sep. 1992, 20 pages.
Craig Partridge, Gigabit Networking, Addison Wesley Longman, Inc. 1994, pp. 253-263.
M. Shreedhar and George Varghese, "Efficient Fair Queuing Using Deficit Round-Robin," Proc. SIGCOMM '95 Cambridge, MA, ACM, 1995, pp. 231-242.
M. Shreedhar and George Varghese, "Efficient Fair Queuing Using Deficit Round-Robin," IEEE/ACM Transactions on Networking, vol. 4, No. 3, Jun. 1996, pp. 375-385.
Sugih Jamin et al., "A Measurement-Based Admission Control Algorithm for Integrated Service Packet Networks," IEEE/ACM Transactions on Networking, vol. 5, No. 1, Feb. 1997, pp. 56-70.
Grenville Armitage, Quality of Service in IP Networks: Foundations for a Multi-Service Internet, Macmillan Technical Publishing, Apr. 2000, pp. 35-104.
George Coulouris et al., Distributed Systems: Concepts and Design, Third Edition, Addison-Wesley, 2001, pp. 607-633.
S. Keshav, An Engineering Approach to Computer Networking: ATM Networks, The Internet, and the Telephone Network, Addison Wesley Longman, Inc. 1997, Chapter 9, pp. 209-263.

* cited by examiner

*Primary Examiner*—Chi H Pham
*Assistant Examiner*—Mohammad S Adhami
(74) *Attorney, Agent, or Firm*—The Law Office of Kirk D. Williams (57) ABSTRACT

Methods and apparatus are disclosed for scheduling entities in a system, such as, but not limited to a computer or communications system. Typically, calendar scheduling is used as a primary scheduling mechanism, with spare time allocated to a secondary scheduling mechanism. The secondary scheduling mechanism can use a round robin technique or variant thereof, or any other scheduling methodology. A calendar entry is examined to determine whether to process a calendar scheduled entity corresponding to the calendar entry or to process a secondary scheduled entity. Which scheduling entity to process is typically determined based on an eligibility of an entity corresponding to the primary scheduled event, a scheduling mechanism indicator, and/or an entity indicator. These combinations of scheduling mechanisms can be used to identify which packets to send, queues or ports to access, processes or threads to execute, or for any other purpose.

16 Claims, 6 Drawing Sheets

METHODS AND APPARATUS FOR SCHEDULING ENTITIES USING A PRIMARY SCHEDULING MECHANISM SUCH AS CALENDAR SCHEDULING FILLED IN WITH ENTITIES FROM A SECONDARY SCHEDULING MECHANISM

FIELD OF THE INVENTION

This invention especially relates to scheduling of packets, processes and/or other entities used in communications, computer systems and/or other systems; and more particularly, the invention relates to scheduling entities using a primary scheduling mechanism such as calendar scheduling filled in with entities from a secondary scheduling mechanism.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

A network device, such as a switch or router, typically receives, processes, and forwards or discards a packet. For example, an enqueuing component of such a device receives a stream of various sized packets which are accumulated in an input buffer. Each packet is analyzed, and an appropriate amount of memory space is allocated to store the packet. The packet is stored in memory, while certain attributes (e.g., destination information and other information typically derived from a packet header or other source) are maintained in separate memory. Once the entire packet is written into memory, the packet becomes eligible for processing, and an indicator of the packet is typically placed in an appropriate destination queue for being serviced according to some scheduling methodology.

When there is a contention for resources, such as on output links of a packet switching system or interface or even for compute cycles in a computing device, it is important for resources to be allocated or scheduled according to some fairness policy. Moreover, the amount of work required to schedule and to enqueue and dequeue a packet or other scheduled item is important, especially as the operating rate of systems increase.

Ordinary time division multiplexing (TDM) is a method commonly used for sharing a common resource between several clients. All scheduled clients are served one at a time at predetermined times and for pre-allocated time periods, which is a very useful property for many applications. This method is often used for multiplexing multiple synchronous items over a higher speed communications link, such as that used for multiplexing multiple telephone calls over a single facility or interleaving packets. However, in a dynamic environment wherein items may not require the full amount of their allocated time slot such as when an item may only require none or only a portion of a particular allocated time slot, then bandwidth of the resource is typically wasted.

Ordinary round-robin (RR) is a another method commonly used for sharing a common resource between several clients. All clients are served in a cyclic order. In each round every client will be served if it is eligible. When served, each client is permitted to send one packet. Servicing of queues is simple to implement and can be done in constant time, but, due to the varying size of packets, does not allocate bandwidth fairly. For example, certain higher priority or larger bandwidth ports or streams of packets many not get their desired amount of bandwidth, which may especially be the case when serving one large and numerous smaller traffic streams or when different priorities of traffic are scheduled.

In some scenarios, high priority (e.g., low latency), guaranteed bandwidth, best effort traffic (e.g., spare bandwidth) and other classifications of traffic compete for a common resource. Various known scheduling methods are designed to provide isolation, prioritization, and fair bandwidth allocation to traffic competing for a common resource. These are known as fair queuing methods. Some examples are Weighted Fair Queuing (WFQ), Self-Clocked Fair Queuing (SCFQ), and Deficit Round Robin/Surplus Round Robin (referred to as DRR).

WFQ, and SCFQ depend upon arrival times as well as previous link utilization in order to calculate the next best packet to send. The accepted "ideal" behavior is bit-by-bit round robin, which states that the next packet to send should be the packet which would have completed if all packets currently in the system send one bit each round robin (which is typically not practical in a packet based system). The inclusion of arrival times in the scheduling method, in order to calculate theoretical ideal departure times, typically requires insertion into a sorted list which is known to be an O(log N) problem worst case where N is the number of packets already enqueued.

DRR is a method used for sharing a common resource between several clients with different ratios between clients (i.e., some clients are allowed to consume more of the resources than others). The ratio between clients is typically defined by a parameter called a quantum.

DRR services queues using round-robin servicing with a quantum assigned to each queue. Unlike traditional round-robin, multiple packets up to the specified quantum can be sent resulting in each queue sending at least a quantum's worth of bytes. If the quantum for each queue is equal, then each queue will send an equal amount of bandwidth.

This DRR approach works in rounds, where a round is one round-robin iteration over the queues that have items to be sent. Typically, when the queue is scheduled, it is allowed to transmit until its deficit becomes negative, and then the next queue is served. Packets coming in on different flows are stored in different queues. Each round, each queue is allocated a quantum worth of bits, which are added to the deficit of each queue. Each queue is allowed to send out one or more packets in a DRR round, subject to the restriction that it cannot send more bits than indicated by the deficit corresponding to the queue. If there are no more packets in a queue after the queue has been serviced, the deficit corresponding to the queue is set to zero. Otherwise, the remaining amount (i.e., the deficit minus the number of bits sent) is maintained for the next round.

DRR is a method that does not depend upon actual arrival times and has complexity of O(1)—that is the amount of work required is a constant and independent of the number of packets enqueued. In order to be work conserving, a packet should be sent every time a queue is scheduled no matter its size. Thus, the quantum used in DRR should be at least one maximum packet size (MTU) to guarantee that when the quantum is added to any deficit, the resulting value is at least zero. DRR provides fair bandwidth allocation and is easy to implement. It is work conserving and, because of its O(1) properties, it scales well with higher link speeds and larger number of queues. However, its scheduling behavior deviates quite a bit from the bit-by-bit round robin "ideal". In particular, latency for a system with N queues is Q*N where Q is the average quantum, which must be at least one maximum transport unit (MTU).

Desired are new methods and apparatus for scheduling of packets in a packet switching system, especially those which may provide good latency performance and/or have other desirable characteristics.

SUMMARY OF THE INVENTION

Methods and apparatus are disclosed for scheduling entities in a system, such as, but not limited to a computer or communications system. In one embodiment, multiple primary scheduled and secondary scheduling entries are maintained. A primary scheduler position is advanced to a next primary scheduling entry of the primary scheduling entries. The primary scheduling entry is used to identify whether to process a primary scheduled entity corresponding to the next primary scheduling entry or to perform a secondary scheduled entity.

In one embodiment, the primary scheduling entries are maintained in a calendar data structure and accessed sequentially. In one embodiment, the secondary scheduling entries are maintained in a series and entries are accessed in a different fashion having O(1) properties. In one embodiment, these secondary scheduling entries are accessed in a round robin fashion. In one embodiment, the next primary scheduling entry includes a value corresponding to an amount of processing (e.g., packets or bytes to send, amount of time to process, etc.) to be performed. In one embodiment, whether to perform a primary scheduled event or to perform a secondary scheduled event is determined based on an eligibility of an entity corresponding to the primary scheduled event, a scheduling mechanism indicator, and/or an entity indicator. These combinations of scheduling mechanisms can be used to identify which packets to send, queues or ports to access, processes or threads to execute, or for any other purpose.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Methods and apparatus are disclosed for scheduling entities in a system, such as, but not limited to a computer or communications system. Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or identification of a packet. Moreover, these packets may contain one or more types of information, including, but not limited to, voice, data, video, and audio information. The term "item" is used herein to refer to a packet or any other unit or piece of information or data. The phrases "processing a packet" and "packet processing" typically refer to performing some steps or actions based on the packet, and which may or may not include modifying and/or forwarding the packet.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may be performed in the same or in a different serial or parallel ordering and/or by different components and/or processes, threads, etc., and/or over different connections and be combined with other functions in other embodiments in keeping within the scope and spirit of the invention. Furthermore, the term "identify" is used generically describe any manner or mechanism for directly or indirectly ascertaining something, which may included, but is not limited to receiving, retrieving from memory, determining, calculating, generating, etc.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, data base, and/or one or more or an organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units. Additionally, the use of a singular tense of a noun is non-limiting, with its use typically including one or more of the particular item rather than just one (e.g., the use of the word "memory" typically refers to one or more memories without having to specify "memory or memories," or "one or more memories" or "at least one memory", etc.) Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modify or not modifying the coupled signal or communicated information. The term "subset" is used to indicate a group of all or less than all of the elements of a set. Moreover, the term "or" is used herein to identify a selection of one or more, including all, of the conjunctive items.

Methods and apparatus are disclosed for scheduling entities in a system, such as, but not limited to a computer or communications system. In one embodiment, the primary scheduling mechanism is used to schedule entities, such as, but not limited to packets, queues, threads, processes, etc. When the next entity to be processes (or performed, etc.) as determined by the primary scheduling mechanism is not ready, then a secondary scheduling mechanism, typically operating in parallel to the primary scheduling mechanism, is used to quickly identify an entity to perform. Thus, an entity can be processed while the primary scheduling mechanism determines a next entity. Additionally, in one embodiment, an entry of the primary scheduling mechanism can indicate to use the secondary scheduling mechanism, possibly including an indication of an amount of processing to be performed based on the secondary scheduling mechanism.

In one embodiment, multiple primary scheduled entries and multiple secondary scheduled entries are maintained. A secondary scheduling position is advanced to a next secondary scheduled entry. A primary scheduling position is advanced to a next primary scheduled entry. A determination is made whether to process an entity corresponding to the next primary scheduled entry or the next secondary scheduled entry based on the next primary scheduled entry.

In one embodiment, calendar scheduling is used as a primary scheduling mechanism, with spare time allocated to a secondary scheduling mechanism. As used herein, "calendar scheduling" is generically used to identify a class of scheduling mechanisms that can be traversed to identify, inter alia, entities to be processed. In one embodiment, another scheduling mechanism is used as the primary scheduling mechanism. The secondary scheduling mechanism can use a round robin technique or variant thereof, or any other scheduling methodology. In one embodiment, a calendar entry is examined to determine whether to process a calendar scheduled entity corresponding to the calendar entry or to process a secondary scheduled entity. Which scheduling entity to process is typically determined based on an eligibility of an entity corresponding to the primary scheduled event, a scheduling mechanism indicator, and/or an entity indicator. These combinations of scheduling mechanisms can be used to identify which packets to send, queues or ports to access, processes or threads to execute, or for any other purpose.

Figure 1:
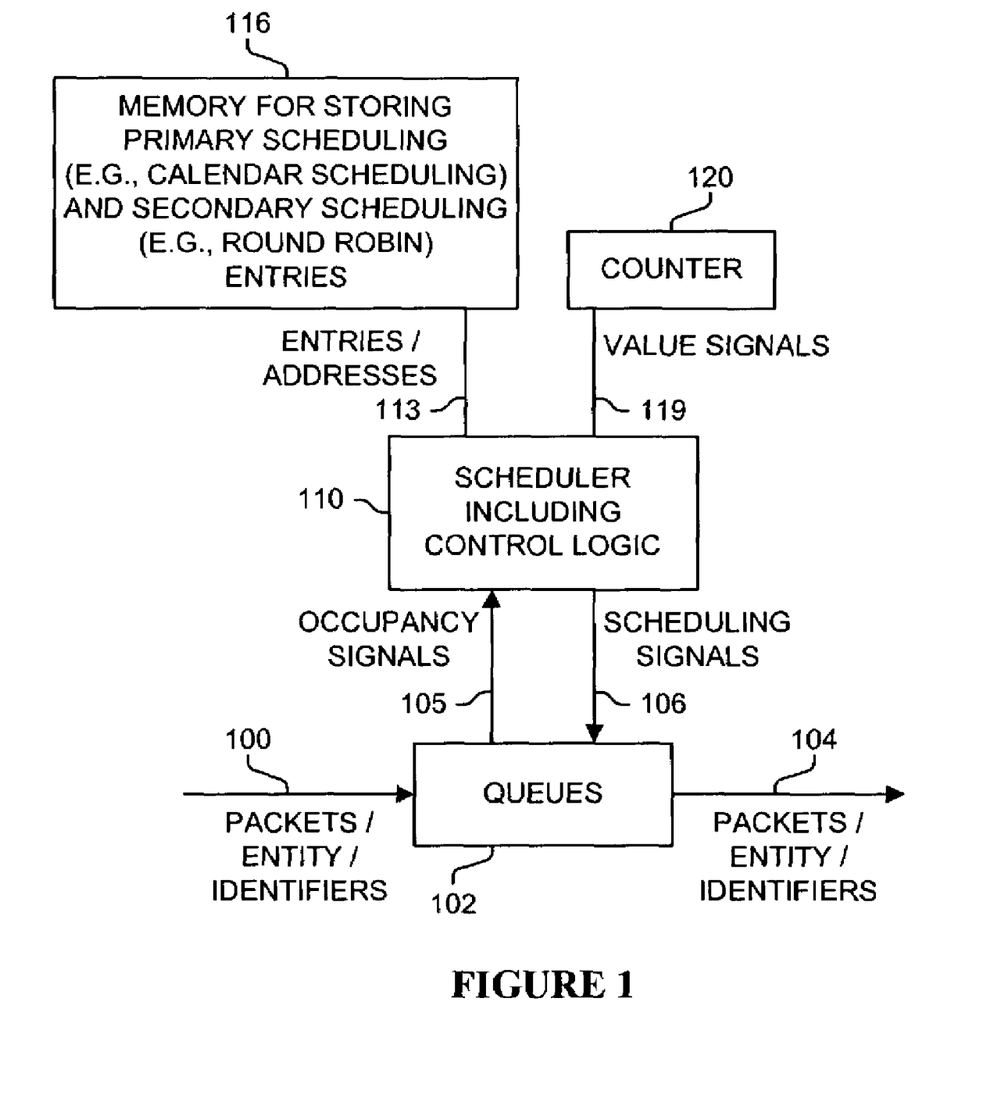
FIG. 1 is a block diagram of one embodiment for scheduling entities using calendar scheduling and a secondary scheduling mechanism.

FIG. 1 illustrates one embodiment of a system such as, but not limited to a computer or communications system, which schedules entities using a primary scheduling mechanism (e.g., calendar or other scheduling) and a secondary scheduling mechanism (e.g., round robin or other scheduling). As shown, packets or other entities or identifiers thereof 100 to be scheduled are received from one or more interfaces, processes, threads, information streams, or other sources. These items 100 are typically stored in queues 102 for scheduling by scheduler 110. In one embodiment, such as that processing packets or communication streams, scheduler 110 processes one or more streams of items 100 to produce one or more items 104 according to the scheduling mechanism.

Scheduler 110, which typically includes control logic, typically receives occupancy signals 105 from queues 102 or from another source, and generates scheduling signals 106 indicating which packets, entities, or other items to process at what time or in what order and possibly a quantitative amount, such as a number of packets or bytes to send. Scheduler 110 uses a memory 116 for maintaining primary scheduling (e.g., calendar scheduling) and secondary scheduling (e.g., round robin scheduling) data structures, and entries and addresses 113 are communicates between scheduler 110 and memory 116. In one embodiment, scheduler 110 also uses a counter 120 for tracking quantitative amounts, and value signals 119 are communicated between scheduler 110 and counter 120 for loading values and indicating a current value or when a threshold value has been crossed.

Figure 2:
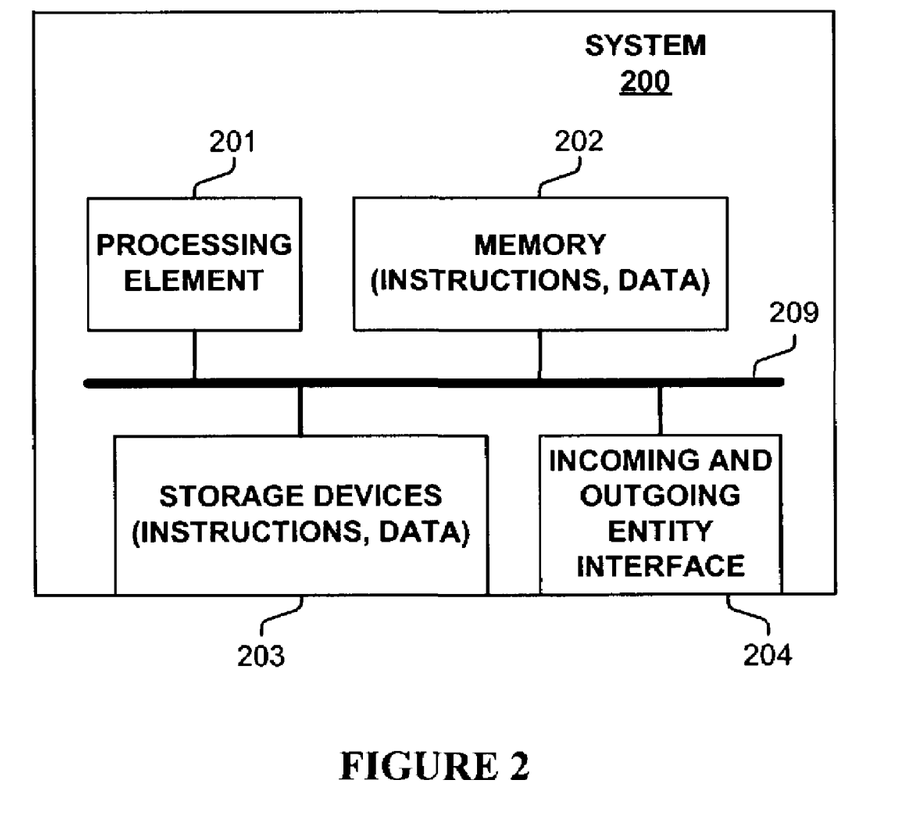
FIG. 2 is a block diagram of one embodiment for scheduling entities using calendar scheduling and a secondary scheduling mechanism.

FIG. 2 illustrates one embodiment of a system such as, but not limited to a computer or communications system, which schedules entities using a primary scheduling mechanism (e.g., calendar scheduling) and a secondary scheduling mechanism (e.g., round robin scheduling). In one embodiment, system 200 schedules internally generated entities, such as, but not limited to processes, threads, information streams, packets or other entities. In one embodiment, system 200 receives externally generated entities and/or internally generates entities, and schedules the processing and/or sending of these entities by system 200 or by another system. For example, in one embodiment, system 200 schedules internal processes, threads, etc. In one embodiment, system 200 receives streams of packets (or other information units), schedules packets belonging to these streams, and generates one or more external streams of scheduled packets.

In one embodiment, system 200 includes a processing element 201, memory 202, storage devices 203, and optionally one or more incoming and/or outgoing entity interface 204, which are typically coupled via one or more communications mechanisms 209 (shown as a bus for illustrative purposes). Various embodiments of system 200 may include more or less elements. The operation of system 200 is typically controlled by processing element 201 using memory 202 and storage devices 203 to perform one or more scheduling tasks or processes. Memory 202 is one type of computer-readable medium, and typically comprises random access memory (RAM), read only memory (ROM), flash memory, integrated circuits, and/or other memory components. Memory 202 typically stores computer-executable instructions to be executed by processing element 201 and/or data which is manipulated by processing element 201 for implementing functionality in accordance with the invention. Storage devices 203 are another type of computer-readable medium, and typically comprise solid state storage media, disk drives, diskettes, networked services, tape drives, and other storage devices. Storage devices 203 typically store computer-executable instructions to be executed by processing element 201 and/or data which is manipulated by processing element 201 for implementing functionality in accordance with the invention.

Figure 3A:
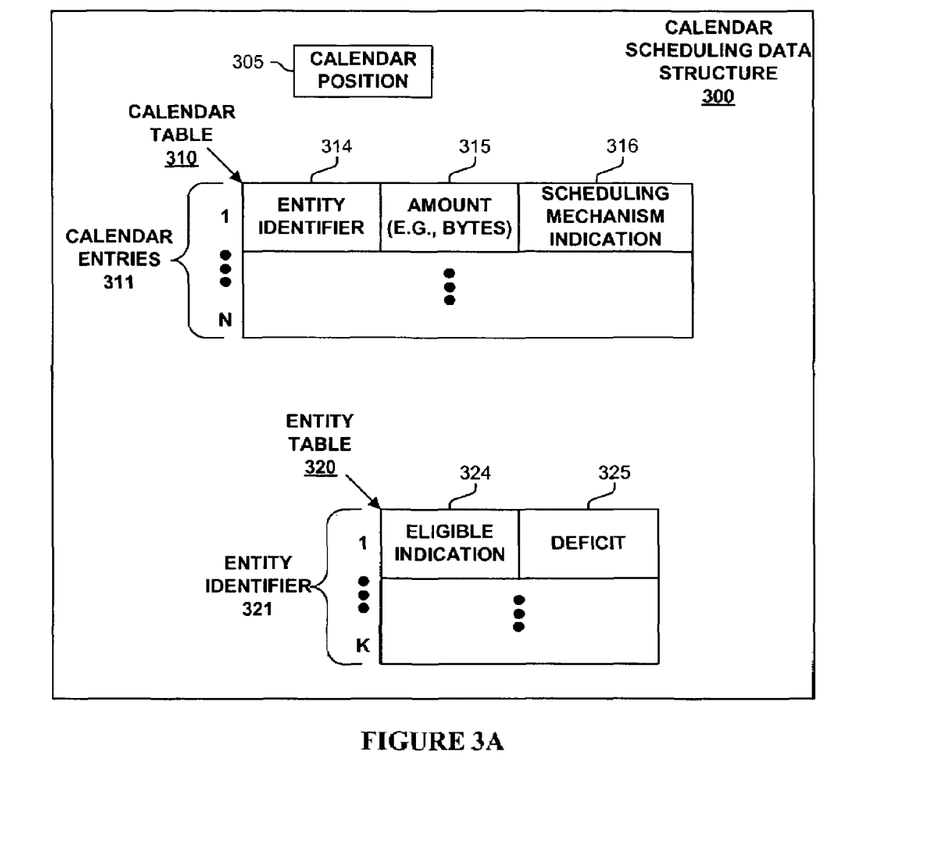
FIGS. 3A-B are block diagrams of data structures used in one embodiment.

FIG. 3A illustrates a calendar data structure 300 used in one embodiment for maintaining calendar table 310, calendar position 305, and an entity table 320. Calendar table 310 includes multiple calendar entries 311, each calendar entry typically identifies the corresponding entity and corresponding amount of information to be sent or processed. In addition, an optional indication to force calendar scheduling or secondary scheduling may be included in the calendar entry, or this indication may be inherent by the value of the entity identifier such as by a null, invalid, special or predetermined entity identifier indicating to use the secondary scheduling mechanism. In one embodiment, calendar entries 311 are maintained in a table or array data structure, although any data structure may be used such as a linked list or other data structure. In one embodiment, data structure 300 is used for other primary or secondary scheduling mechanisms.

Calendar position 305 typically indicates a current one of the calendar entries 311 within calendar table 310. In one embodiment, calendar position 305 includes a memory location or register for storing a value, pointer, or other position indication. In one embodiment, calendar position 305 includes a counter or other mechanism for maintaining a position or current calendar entry of calendar entries 311.

In one embodiment, each calendar entry of multiple calendar entries 311 includes an entity identifier 314 for indicating a corresponding entity, packet, thread, etc. to process, an amount 315 indicating an amount or maximum amount of processing to be performed, and an optional scheduling mechanism indication 316 (e.g., a single bit or other data structure) indicating whether this calendar entry corresponds to calendar scheduling or secondary scheduling, with the amount of processing to be performed typically indicated by amount field 315. One embodiment using more than one secondary scheduling mechanisms indicates in scheduling mechanism indication 316 (e.g., by a value or other indication using any data structure) which of the primary (e.g., calendar scheduling) or multiple secondary scheduling mechanisms to use. One embodiment does not include a scheduling mechanism indication 316 in calendar entries 311.

Additionally, one embodiment includes entity table 320 to indicate whether an entity is eligible (e.g., requires processing, such as a queue having one or more packets to be sent) and possibly a deficit value. As a particular entity can typically be scheduled in multiple places in calendar table 310 and also by a secondary scheduling mechanism, it is typically more efficient to store information pertaining to a particular entity in a single place so that a single update can be made and all occurrences react to that single update. Although, one embodiment that uses these indications includes these fields in each of the calendar entries whereby if there are multiple entries corresponding to a particular entity, each of these multiple entries must be updated.

In one embodiment, entity table 320 includes an eligible indication 324 (e.g., a single bit or other data structure) to indicate whether an entity is eligible (e.g., requires processing, such as a queue having one or more packets to be sent) and a deficit value 325 to maintain an exceed amount over the scheduled amount (e.g., that specified in amount field 315). Moreover, one embodiment uses a deficit value to maintain an underused amount, although one embodiment does not maintain underused amounts and thus in this case, deficit 325 would typically be set to zero. The use of deficits is optional, and implementation of an embodiment using deficits has some additional complexity, so some embodiments do not provide for this mechanism. Deficits may be more useful when entities perform functions in discrete intervals such sending various sizes of packets where the scheduled amount may be greatly exceeded by the varying amounts of actual processing. In one embodiment, entities are identified by numeric values (e.g., a port, queue, or process number, etc.)

and thus an entity identifier 321 can typically be used directly or via a hashing or other function to index into entity table 320. In one embodiment, entity table 320 includes a pointer, value or other indication to identify the particular entity.

Figure 3B:
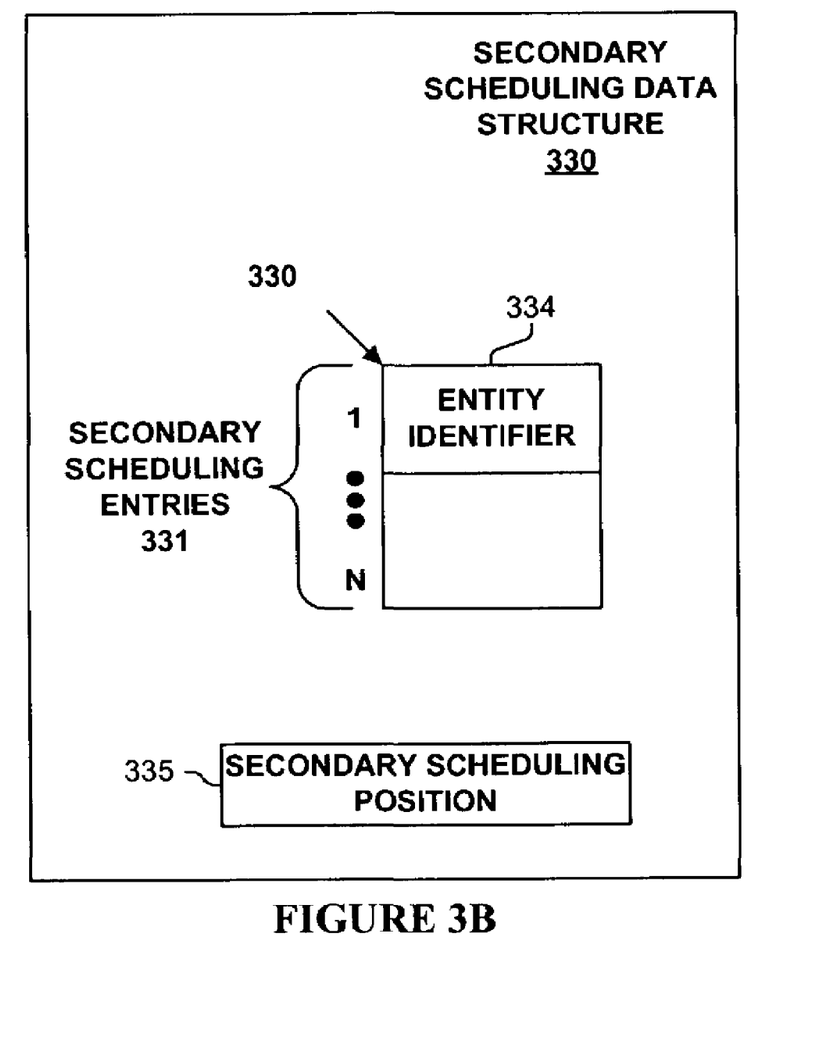

FIG. 3B illustrates a secondary scheduling data structure 330 used in one embodiment for maintaining multiple secondary scheduling (e.g., round robin, calendar scheduling, DRR or other scheduling mechanism) entries 331 and a current secondary scheduling position 335. In one embodiment, secondary scheduling entries 331 are maintained in the form of table, although one embodiment maintains entries 331 as a linked list or other data structure, and are accesses in a round robin or other fashion. In one embodiment, secondary scheduling position 335 includes a memory location or register for storing a value, pointer, or other position indication of one of the secondary scheduling entries 331. In one embodiment, secondary scheduling position 331 includes a counter or other mechanism for maintaining a position or current secondary scheduling entry of secondary scheduling entries 331. In one embodiment, each entry of secondary scheduling entries 331 includes an entity identifier 334, which indicates (like entity identifier 314 of FIG. 3A) a corresponding entity, packet, thread etc. to process.

Figure 4:
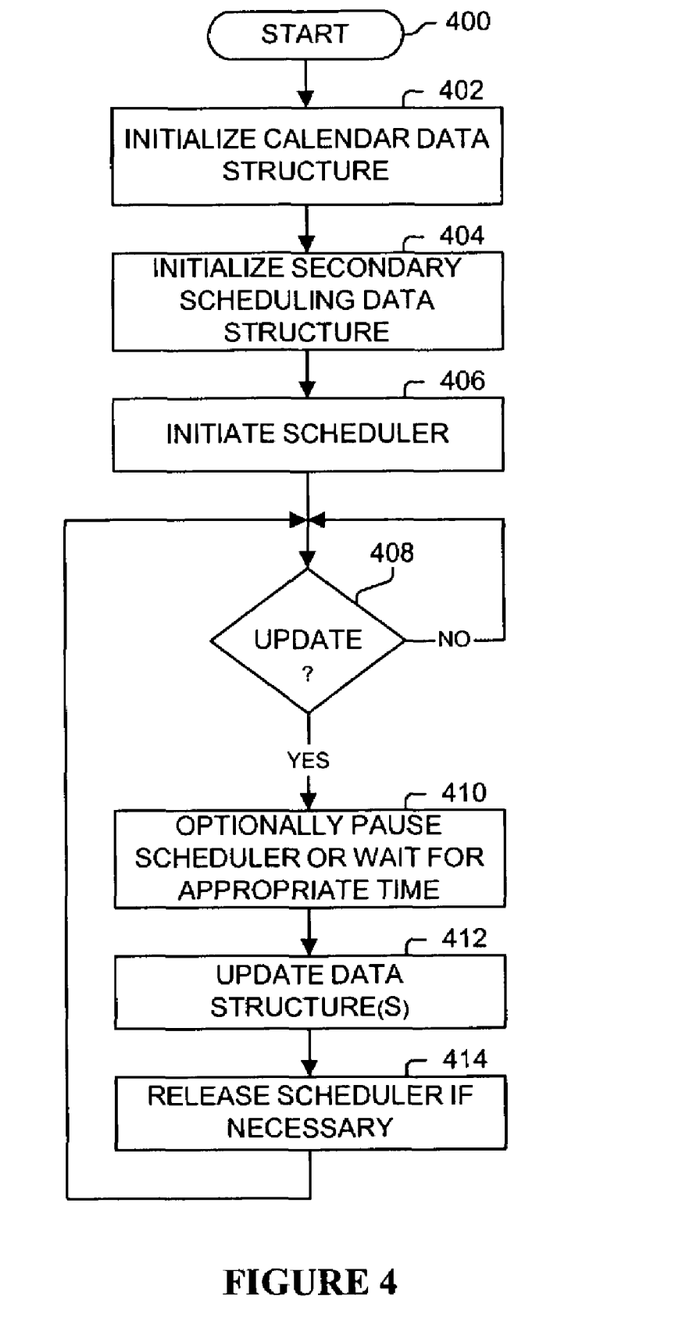
FIG. 4 is a flow diagram of a process used in one embodiment for maintaining the scheduling data structures and for controlling the scheduling.

FIG. 4 is a flow diagram of a process used in one embodiment for maintaining the scheduling data structures and for controlling the scheduling. Processing begins with process block 400, and proceeds to process block 402, wherein entries of a calendar data structure are initialized. In process block 404, secondary scheduling entries of a secondary scheduling data structure are initialized. In process block 406, the scheduler is initiated to perform the primary (e.g., calendar scheduling or any other scheduling mechanism) and secondary (e.g., round robin or any other scheduling mechanism) scheduling.

Until there is an update to be made to the primary or secondary scheduling data structures, processing loops at process block 408. When there is an update to be made, then in process block 410, optionally, the scheduling mechanism corresponding to the data structure or structures being updated is briefly stopped or the update is delayed until an appropriate time. In process block 412, the update is applied to one or more of the data structures. In process block 414, the scheduler is released or restarted if necessary, and processing returns to process block 408. In one embodiment, an update technique is used which does not pause scheduling. Such techniques may be more complex, and for many uses of the scheduling mechanisms disclosed herein, pausing the scheduling mechanism for a short period of time has little or no effect on the scheduling or overall system performance.

Figure 5:
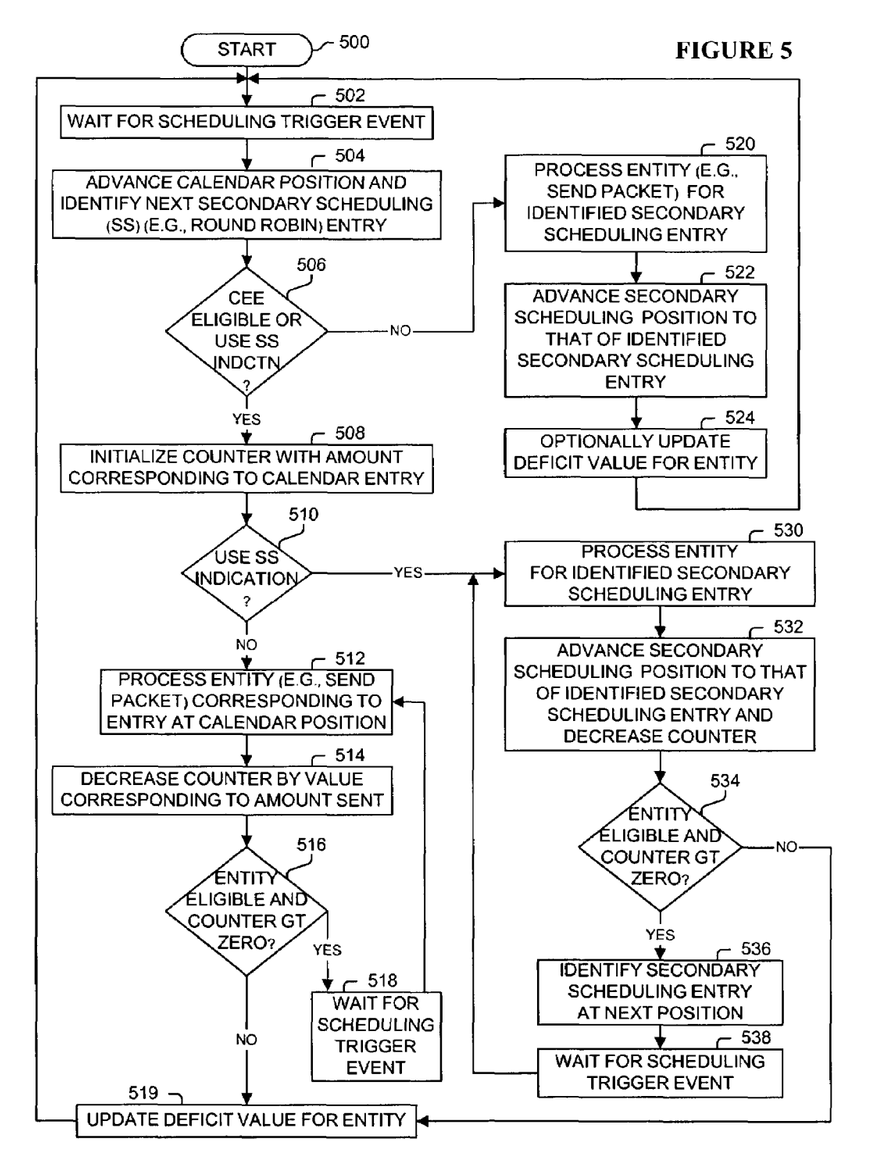
FIG. 5 is a flow diagram of a process used in one embodiment for scheduling the calendar and secondary scheduling entries and for performing actions corresponding to the entries.

FIG. 5 is a flow diagram of a process used in one embodiment for scheduling the calendar (e.g., primary) and secondary scheduling entries and for performing actions corresponding to the entries. Note, FIG. 5 may discuss entity processing as especially corresponding to sending one or more packets; however, the methodology disclosed herein directly applies to scheduling mechanisms in an unlimited number of other contexts, such as, but not limited to allocating CPU time to a process or thread. Moreover, FIG. 5 may reference calendar and round robin scheduling, although embodiments use another primary scheduling mechanism and other one or more secondary scheduling mechanisms.

Referring to FIG. 5, processing begins with process block 500, and proceeds to process block 502, wherein the process optionally waits for a next scheduling trigger event, which may be an indication by a system that it is ready, a next event or a delay until a next scheduling cycle, etc. In process block 504, the calendar position is advanced to a next calendar entry and a next secondary scheduling entry is identified.

In one embodiment, the secondary scheduling position identifies the next secondary scheduling entry. In one embodiment, the secondary scheduling position identifies the last secondary scheduling entry processed, which allows the secondary scheduling mechanism to be updated (e.g., in response to an entity becoming ineligible) and always an eligible secondary scheduling entry is accessed. In this case, it is typically desirable, but not required, to identify the next secondary scheduling entry at this time so that should it become necessary to use, it is readily available. Moreover, this identification process can be done in parallel to the advancement of the calendar position and accessing of the calendar (or other primary scheduling) entry.

As determined in process block 506, if the entity corresponding to the next calendar entry (CEE) is eligible (e.g., as indicated in a data structure or by a signal) or the entry indicates to use a secondary scheduling mechanism (e.g., by a scheduling mechanism indication field, or the entity identifier is null or invalid, etc.), then processing proceeds to process block 508 (discussed hereinafter); otherwise processing proceeds to process block 520 to process an entity using a secondary scheduling mechanism such that this scheduling process causes some processing to be performed. In process block 520, the entity corresponding to the identified next secondary scheduling entry is processed (e.g., a packet is sent). In process block 522, the secondary scheduling position is advanced to that of the next secondary scheduling entry (e.g., the one corresponding to the sent packet). In process block 524, the deficit value of the entity is optionally updated to reflect the amount of processing performed in process block 520. One embodiment does not perform process block 524. Processing then returns to process block 502.

Otherwise, processing proceeds to process block 508, wherein a counter or other data structure is initialized with the value or a corresponding amount from a field of the next calendar entry adjusted by the deficit value of the entity (e.g., the amount minus the deficit, etc.) Processing proceeds to process a corresponding entry. Note, one embodiment checks at this point to see if this resultant value is less than zero, and if so, processing returns to process block 502. However, the process illustrated in FIG. 5 guarantees that some processing is performed for the scheduling work performed by deferring this check until after an initial set of processing is performed.

As determined in process block 510, if the next calendar entry identifies to use a secondary scheduling mechanism (e.g., round robin scheduling), then an amount of processing (e.g., the number of packets sent) corresponding to the value contained in the calendar entry will be sent using an identified secondary scheduling mechanism in process blocks 530-538.

In process block 530, the entity corresponding to the identified next secondary scheduling entry is processed (e.g., a packet sent from the corresponding queue). In process block 532, the current secondary scheduling position is advanced to that of the next secondary scheduling entry (e.g., the one corresponding to the entry for which processing was performed in process block 530) and the counter or other data structure is decreased by a corresponding processing amount (e.g., by one for one packet sent, by the number of bytes in the sent packet, by a processing time, etc.). As determined in process block 534, if the entity is still eligible and the counter is greater than zero, then processing proceeds to process block 536, wherein a new next secondary scheduling entry is identified; in process block 538, processing optionally waits for a next scheduling trigger event; and processing then returns to process block 530 to process other entities (e.g., send more packets). Otherwise, processing proceeds to process block 519, wherein the deficit value for the processed entity is updated by the amount corresponding to the amount of processing performed, and processing returns to process block 502. In one embodiment, the deficit can reflect over-processed and/or under-processed values. In one embodiment, the deficit reflects only over-processed values and it is set to zero if the processing performed is less than the amount allowed. In one embodiment, threshold are used to limit the range of the value of the deficit.

Otherwise, an entity indicated by the primary scheduling (e.g., calendar scheduling) mechanism is to processed, and processing proceeds from process block 510 to process block 512, wherein an entity corresponding to the calendar entry is processed (e.g., a packet is sent). In process block 514, the counter is decreased by a corresponding amount (e.g., by one for one packet sent, by the number of bytes in the sent packet, by a processing time, etc.). As determined in process block 516, if the entity corresponding to the calendar entry is still eligible (e.g., it still has packets to send or other processing to be performed) and the counter is greater than zero, then processing proceeds to process block 518 to optionally wait for the next scheduling trigger before returning to process block 512 to process more entities (e.g., send more packets). Otherwise, processing proceeds to process block 519, wherein the deficit value for the processed entity is updated by the amount corresponding to the amount of processing performed, and processing returns to process block 502.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method for scheduling, the method comprising:
   storing both a plurality of primary scheduling entries and a plurality of secondary scheduling entries in one or more scheduling data structures in one or more memories, said one or more scheduling data structures used by a scheduler in its determination of the order of processing a plurality of entities, wherein the plurality of entities are distinct from the plurality of primary scheduling entries and from the plurality of secondary scheduling entries; and wherein the plurality of entities are not stored in said one or more scheduling data structures;
   the scheduler determining a next primary scheduling entry of the plurality of primary scheduling entries, said determined next primary scheduling entry including a scheduling mechanism indicator which is a value defining which of a plurality of options to process, said options including: (a) an entity corresponding to said determined next primary scheduling entry, and (b) one or more entities corresponding to one or more next secondary scheduling entries in the plurality of secondary scheduling entries; and
   in response to the scheduling mechanism indicator of said determined next primary scheduling entry causing the processing of said defined option.

2. The method of claim 1, wherein said determined next primary scheduling entry includes a value indicating an amount of said processing of the entity corresponding to said determined next primary scheduling entry or said one or more entities corresponding to one or more next secondary scheduling entries in the plurality of secondary scheduling entries.

3. The method of claim 1, wherein the scheduling mechanism indicator defines to process one or more entities corresponding to one or more next secondary schedule entries in the plurality of secondary scheduling entries when the scheduling mechanism indicator is null, invalid, or a predetermined secondary scheduling value.

4. The method of claim 3, wherein said determined next primary scheduling entry includes a value indicating an amount of said processing of the entity corresponding to said determined next primary scheduling entry or said one or more entities corresponding to one or more next secondary scheduling entries in the plurality of secondary scheduling entries.

5. The method of claim 1, wherein said entities corresponding to each of plurality of primary scheduling entries and each of the plurality of secondary scheduling entries are queues or ports.

6. The method of claim 1, wherein said entities corresponding to each of plurality of primary scheduling entries and each of the plurality of secondary scheduling entries are queues of packets.

7. The method of claim 1, wherein said entities corresponding to each of plurality of primary currently amended entries and each of the plurality of secondary currently amended entries are processes or threads.

8. An apparatus for scheduling, the apparatus comprising:
   one or more memories including a plurality of calendar scheduling entries and a plurality of round robin entries;
   a plurality of packet queues configured to store packets; and
   a scheduler configured to initiate sending of packets from the plurality of packet queues based on the plurality of calendar scheduling entries and the plurality of round robin entries;
   wherein the scheduler is configured to sequence through the plurality of calendar scheduling entries, and for each particular calendar entry of the plurality of calendar scheduling entries, evaluate a scheduling mechanism indicator which is a value included in said particular calendar entry in order to determine which of a plurality of options to perform, said options including: (a) to send one or more packets from a queue of the plurality of packet queues corresponding to said particular calendar entry, and (b) to send one or more packets from a queue of the plurality of packet queues corresponding to one or more next round robin entries of the plurality of round robin entries;
   wherein the plurality of calendar scheduling entries and a plurality of round robin entries are distinct from the plurality of packet queues and packets stored therein.

9. The apparatus of claim 8, wherein the scheduler is configured to initiate sending exactly one packet of said one or more packets from a queue of the plurality of packet queues corresponding to the next round robin entry of the plurality of round robin entries when a particular packet queue corresponding to said particular calendar entry is ineligible.

10. The apparatus of claim 8, wherein the scheduler is configured to identify an amount associated with said particular calendar entry; and wherein the scheduler is configured to initiate sending a number of packets corresponding to the amount from a queue corresponding to said particular calendar entry or said next round robin entry when said particular calendar entry is eligible.

11. The apparatus of claim 10, wherein the scheduler is configured to initiate sending a number of packets corresponding to the amount from a queue corresponding to said particular calendar entry when the scheduling mechanism indicator indicates to use calendar scheduling.

12. The apparatus of claim 11, wherein the scheduler is configured to initiate sending a number of packets corresponding to the amount from a queue corresponding to said next round robin entry when the scheduling mechanism indicator indicates to use round robin scheduling.

13. The apparatus of claim 10, wherein the scheduler is configured to initiate sending a number of packets corresponding to the amount from a queue corresponding to said next round robin entry when the scheduling mechanism indicator indicates to use round robin scheduling.

14. The method of claim 1, wherein said one or more data structures includes a calendar data structure, the plurality of primary scheduling entries are maintained in the calendar data structure, and said operation of the scheduler determining the next primary scheduling entry includes identifying the next primary scheduling entry from the calendar data structure.

15. The method of claim 14, wherein said processing of said entities corresponding to said next secondary scheduling entries includes processing a plurality of said entities corresponding to said next secondary scheduling entries in a round-robin order.

16. An apparatus for scheduling, the apparatus comprising:
one or more memories storing both a plurality of primary scheduling entries and a plurality of secondary scheduling entries in one or more scheduling data structures;
means for determining a next primary scheduling entry of the plurality of primary scheduling entries, said determined next primary scheduling entry including a scheduling mechanism indicator which is a value defining which of a plurality of options to process, said options including (a) an entity corresponding to said determined next primary scheduling entry, and (b) one or more entities corresponding to one or more next secondary scheduling entries in the plurality of secondary scheduling entries; and
means for processing, in response to the scheduling mechanism indicator of said determined next primary scheduling entry, said defined option; wherein said entity corresponding to said determined next primary scheduling entry and said one or more entities corresponding to one or more next secondary are not stored in said one or more memories storing said one or more scheduling data structures.

* * * * *

UNITED STATES PATENT AND TRADEMARK OFFICE
CERTIFICATE OF CORRECTION

PATENT NO. : 7,583,678 B1
APPLICATION NO. : 10/260059
DATED : September 1, 2009
INVENTOR(S) : Levy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1383 days.

Signed and Sealed this

Fourteenth Day of September, 2010

David J. Kappos
*Director of the United States Patent and Trademark Office*